UNITED STATES PATENT OFFICE.

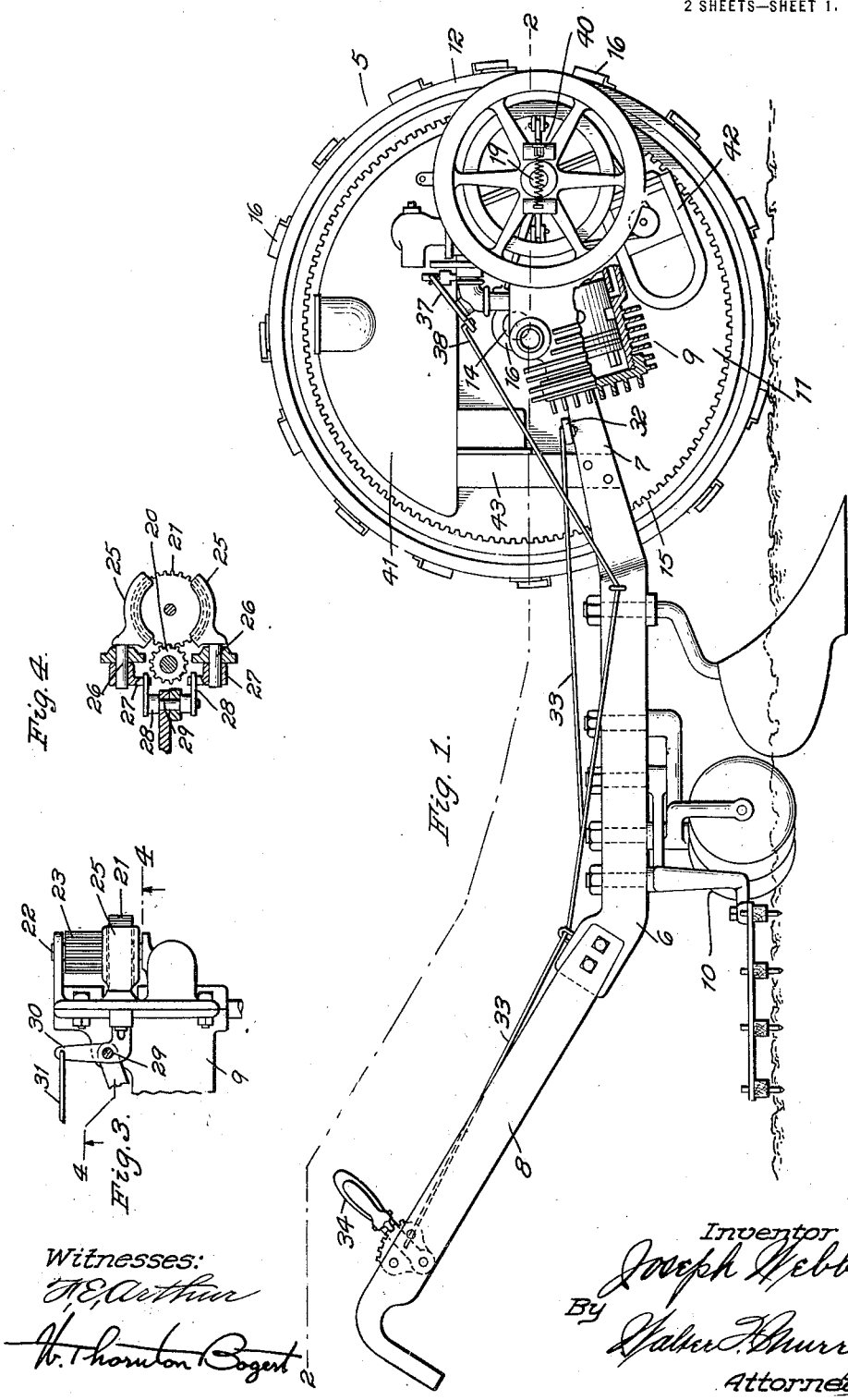

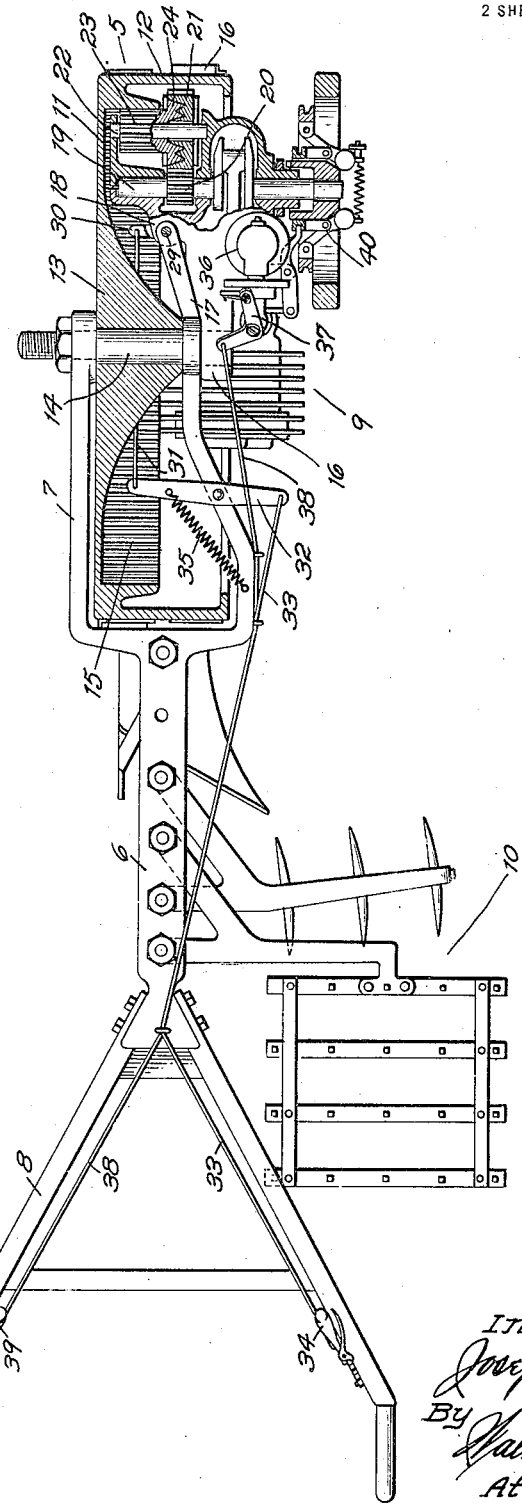

JOSEPH WEBB, OF CINCINNATI, OHIO.

GARDEN-TRACTOR.

1,287,803.  Specification of Letters Patent.  Patented Dec. 17, 1918.

Application filed April 1, 1918. Serial No. 225,858.

*To all whom it may concern:*

Be it known that I, JOSEPH WEBB, a subject of the King of Great Britain, and resident of Cincinnati, in the county of Hamilton and State of Ohio, have invented a new and useful Improvement in Garden-Tractors, of which the following is a specification.

An object of my invention is to produce a tractor small enough and having sufficient power for plowing, disking, harrowing, or otherwise tilling and cultivating garden plots in a manner such that the work may be accomplished in less time, more thoroughly and with less expense than with horse drawn or other power propelled implements known to me.

A further object is a garden tractor of compact and powerful construction, which will operate in small spaces with maximum tractive effort and minimum soil packing action, and which simultaneously with these advantages, may be balanced easily, stopped and started without releasing the handles, and turned as if on a pivot, upon its traction wheel.

These and other objects are attained in the tractor described in the following specification and illustrated in the accompanying drawing, in which:

Figure 1 is a side elevation of a tractor embodying my invention.

Fig. 2 is a sectional plan view taken on the line 2—2 of Fig. 1.

Figs. 3 and 4 are views of details of my improved tractor.

My improved tractor consists of a tractor wheel 5 having an implement beam 6 connected therewith by a fork 7 formed at one end of the beam and which has handles 8 at its opposite end. An engine 9 of the internal combustion type, is mounted upon the fork in position to drive the wheel, and the cultivating implements 10 are adapted to be attached to the beam in some such manner and position as shown.

The wheel is provided with a web or series of spokes 11 to space the rim 12 from the hub 13, the web being formed to one side of the rim to make in effect a hollow wheel. An axle 14 is provided for rotatively mounting the wheel thereon between the branches of fork 7, and within rim 12 I have formed internal gear teeth 15. On the outer surface of the wheel, I have secured a series of angle plates 16 adapted to become embedded within the soil and afford better tractive force upon the implements.

The engine is mounted on the axle 14 by means of a lug 16 into which the end of the axle is screwed, an arm 17, which is an extension of the fork, being provided for supporting the forward end of the engine, a lug 18 being provided on the crank case for attachment thereto of the arm. On the inner end of the engine shaft 19, I have secured a pinion 20 which meshes with a gear 21 which is rotatively and reciprocally mounted upon a secondary shaft 22 to which a pinion 23 is secured and which meshes with teeth 15 of the internal gear. Pinion 23 is provided with a clutch cone 24 which engages a correspondingly shaped recess in gear 21, so that when the gear is moved along the shaft, engagement and disengagement of the clutch will be affected. To effect such reciprocatory movement of the gear 21, I have provided actuating hands 25 which partially embrace the gear and are provided with pins 26 which are rotatively mounted in lugs on the crank case, as shown in Figs. 3 and 4. To the opposite ends of these pins I have attached fingers 27 which are located between the branches of small forks 28 which are connected with a rotatively mounted pin 29 to which arm 17 is attached. One of these forks is a bell crank having an arm 30 to which one end of a link 31 is attached, the opposite end being attached to one end of a lever 32 which is pivotally mounted on the fork 7 between its ends. The opposite end of lever 32 is connected with a cable 33 which extends to a handle 34 adapted to operate the clutch from the right hand handle of the tractor. A spring 35 is provided for retaining the clutch in engaged position, the handle operating merely to disengage it.

In a suitable position the carbureter 36 is mounted, the throttle being controlled by a bell crank 37 which is connected with a cable 38 which connects with a handle 39 on the left hand handle of the tractor. Upon the engine shaft I have mounted a governor 40 which controls an auxiliary throttle, not shown, for the purpose of preventing racing of the engine when the clutch is disengaged. In a suitable position, preferably above the carbureter and within the hollow of the tractor wheel, I have located the fuel tank 41 from which the carbureter receives its supply of fuel, and beneath the engine I have located the ignition apparatus such as the magneto 42. The fuel tank may be supported from the engine frame or from the fork 7 in any suitable manner as by struts 43, as shown in Fig. 1.

One prominent feature of novelty of my improved tractor is the single drive wheel by which the tractor is propelled. This wheel is of sufficient width to prevent its sinking into the garden soil, and at the same time afford an ample gripping surface upon the soil to draw the implements through it, without materially tramping down the soil.

Another feature is the hollow construction of the wheel, by reason of which the engine, the tank, and other elements may be located closely adjacent to a plane through the center of gravity of the wheel and extending longitudinally of the tractor. This creates an easily balanced single wheel construction.

The balance of the tractor is further improved by placing the center of gravity of the engine weight below the center of gravity of the tractor wheel, and the tractive effort of the wheel upon the soil is increased by placing the mass of the engine weight in front of the wheel axle, thus insuring the thorough embedding of the angle plates in the soil as they are brought into contact therewith.

Having thus described my invention, what I claim is:

1. In a garden tractor the combination of an implement beam, a handle projected rearwardly from the beam, a fork projecting forwardly from the beam, an axle mounted in the fork, a hollow tractor wheel journaled upon the axle, and an engine mounted within the tractor wheel and with its center of gravity in front of and below the axle.

2. In a garden tractor the combination of an implement beam, a handle projected rearwardly from the beam, a fork projecting forwardly from the beam, an axle mounted in the fork, a hollow tractor wheel journaled upon the axle, said tractor wheel having gear teeth upon the inner surface of its rim, an engine mounted within the tractor wheel and with its center of gravity in front of and below the axle, and gearing connecting the engine and said gear teeth.

In testimony whereof, I have hereunto subscribed my name this 29th day of March, 1918.

JOSEPH WEBB.

Witnesses:
W. THORNTON BOGERT,
A. KASSON.